United States Patent [19]
Auriemma

[11] 3,724,715
[45] Apr. 3, 1973

[54] DISPENSER WITH METERING SYSTEM

[75] Inventor: Nicholas A. Auriemma, Miami, Fla.

[73] Assignee: Universal Oil Products Company, Des Plaines, Ill.

[22] Filed: Sept. 24, 1970

[21] Appl. No.: 75,016

[52] U.S. Cl. ........................221/4, 221/279, 312/71
[51] Int. Cl. ..............................................B65g 1/16
[58] Field of Search....................312/71; 221/2, 4–8, 221/279, 307

[56] References Cited

UNITED STATES PATENTS

| | | | |
|---|---|---|---|
| 3,591,049 | 7/1971 | Auriemma | 221/279 X |
| 3,436,136 | 4/1969 | McKechnie | 312/71 |
| 2,534,169 | 12/1950 | Hope | 312/71 X |
| 3,475,069 | 10/1969 | Saunders | 312/71 |
| 3,454,319 | 7/1968 | Stentz | 312/71 |

Primary Examiner—Robert B. Reeves
Assistant Examiner—Thomas E. Kocovsky
Attorney—James R. Hoatson, Jr. and Ronald H. Hausch

[57] ABSTRACT

A dispenser for storing and dispensing a plurality of stacked articles having a metering system for determining the amount of articles remaining within the dispenser. The dispenser includes a tubular member having an open end and a spring means which urges the articles through the open end. A stopping means temporarily prevents the articles from passing through the open end and permits the removal of the uppermost article. A movable indexed tape means connects to the movable end portion of the spring means, its movement being in direct relationship to the movement of the end portion of the spring means. A reference means is located adjacent a portion of the indexed tape means to gauge the position of the indexed tape means and thus to gauge the amount of stacked articles remaining within the tubular member.

3 Claims, 4 Drawing Figures

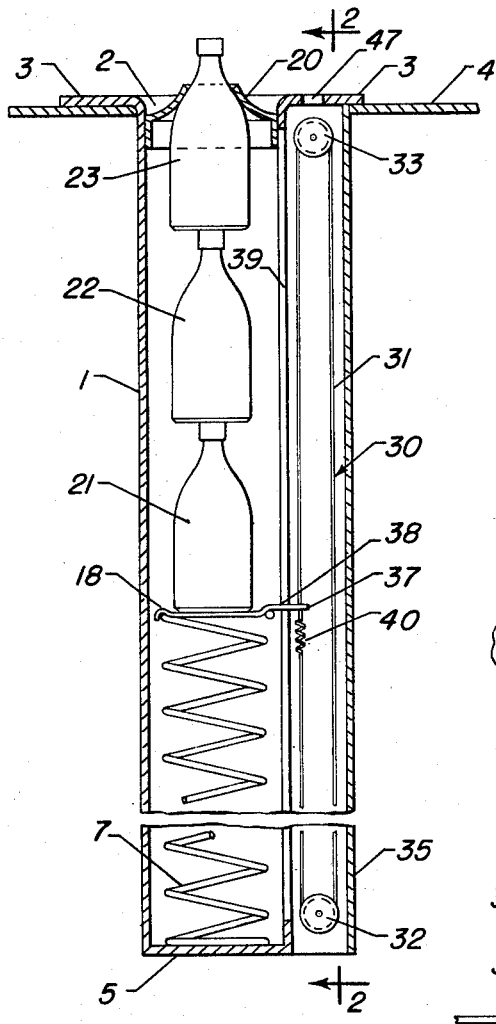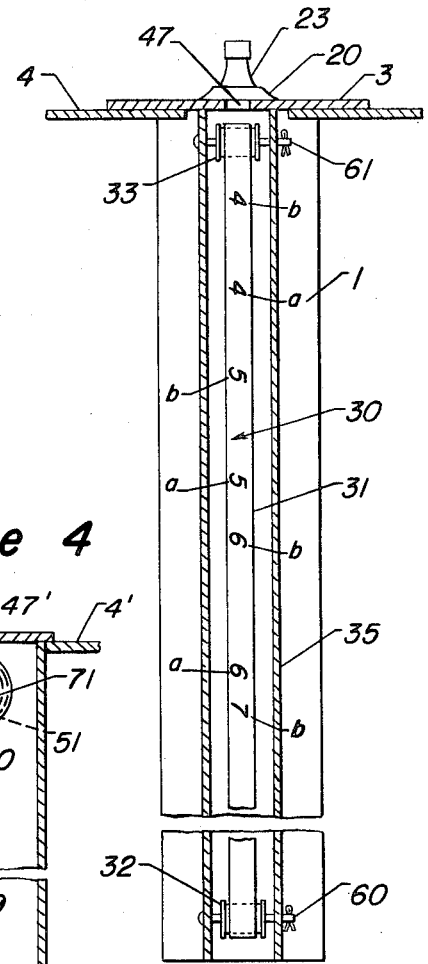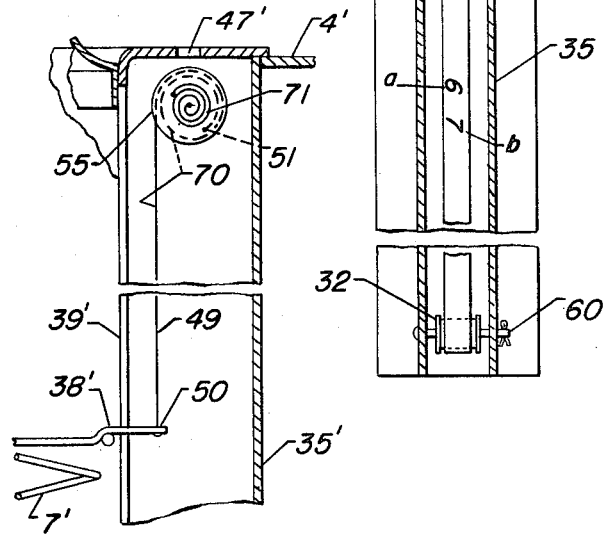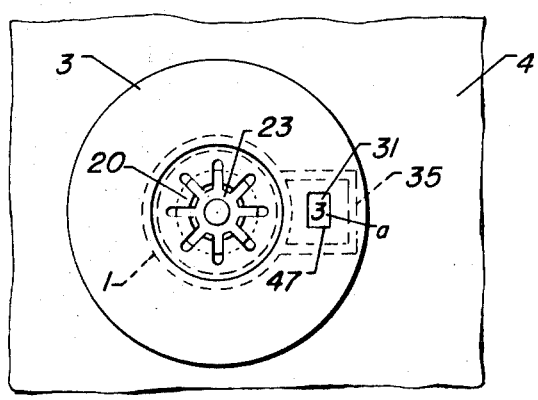

DISPENSER WITH METERING SYSTEM

This invention relates to a dispenser for storing and dispensing a plurality of stacked articles having a metering system for determining the amount of articles remaining in the dispenser. The device is particularly adaptable for use in placement into countertops, movable carts, bars, and other types of serving counters, where there is the frequent handling of bottles or canned beverages such as alcoholic beverages, soups, and the like.

One of the major industries having use for such a dispenser is the transportation industry, and particularly, the airline branch of that industry where the serving of beverages is carried on in a relatively short period of time and within relatively confined areas. In the past, it has been particularly difficult to handle the serving of bottled beverages in a moving airline, because of the narrow aisles and the motion of the plane itself. The serving of liquids or beverages in bottles or cans necessarily requires two hands and consequently, a means to store the bottles or cans not in use is desired to free the server's hands. Also, a means to gauge or determine the amount of bottles or cans remaining in storage is desirable.

It is therefore an object of this invention to provide for a dispensing unit for storing and dispensing a plurality of stacked articles adaptable for countertop installation.

More specifically, it is an object of this invention to provide for a dispensing unit for storing and dispensing a plurality of bottles or cans having a metering system for determining the amount of articles remaining within the dispensing unit.

Broadly, this invention provides for a dispenser for storing and dispensing a plurality of stacked articles having a metering system or gauging system for determining the amount of articles remaining in said dispenser which comprises in combination: an elongated hollow tubular member for containment of said stacked articles, said tubular member having an open end thereof; spring means located within said tubular member for urging said articles through the open end thereof; stopping means adjacent to the open end of said tubular member for temporarily preventing the passing of said articles through the open end thereof and for permitting the removal of the uppermost stacked article from said tubular member; an indexed tape means connected to the movable end portion of said spring means for metering the movement of the end portion of said spring means, said tape means including a movable tape or ribbon having calibrated indexes thereon; and, reference means adjacent to a portion of said tape or ribbon for gauging the position of the tape or ribbon and thus for gauging the amount of stacked articles within said tubular member.

Preferably, the movable tape or ribbon is a substantially continuous tape that is movably supported in a taut path via a pair of pulleys. The tape is indexed with numerals spaced at distances to correspond with the size of the bottles or cans placed within the dispenser. If various sizes of bottles or cans are to be utilized in the dispenser, various scales may be placed on the indexed surface of the tape. Preferably, the reference means adjacent to a portion of the indexed tape is a window placed on the top of the countertop or incorporated into escutcheon or flange of tube in which the dispenser is to be utilized. The tape is attached to the end portion of the spring means in such a manner so that the numeral visible through the window indicates the number of articles or bottles remaining within the dispenser or in the alternative the number of bottles removed from a full dispenser.

In a modified embodiment, the movable tape is a tape having a first and second end, the first end being connected to the movable end portion of the spring means, and the second end connected to a spring loaded take-up pulley or reel biased to maintain the tape in a taut path. In this embodiment the viewing window may be utilized as the reference means. Of course, as was the case in the first embodiment, the scale of the indices is determined by the size of the bottles or cans to be utilized in the dispenser.

Reference to the accompanying drawing and the following description thereof will serve to point out and more fully illustrate the design and construction of this invention as well as to assist in further pointing out the advantageous features in connection therewith.

FIG. 1 is an elevational view, shown in section, of a preferred embodiment of the present improved dispenser.

FIG. 2 is a longitudinal sectional view of the embodiment of FIG. 1 as taken through section line 2—2.

FIG. 3 is a plan view of the portion of the countertop showing the top portion of the dispenser embodied in FIGS. 1 and 2.

FIG. 4 is a longitudinal sectional view of a portion of a dispenser illustrating a modified embodiment of the indexed tape means.

Referring now more particularly to FIGS. 1, 2, and 3 there is shown a preferred embodiment of the dispenser assembly of the present invention. Shown is an elongated hollow tubular member 1 which has an open end 2. This upper open end 2 has been turned to establish a lip 3 which provides support for the dispenser on the surface 4 of the countertop or cart top. Preferably, the elongated tubular member 1 is cylindrically shaped, but of course other shapes may be dictated by the particular shape of articles to be dispensed. Ordinarily, the lower end 5 is closed to provide a support for a spring means 7, but this is not absolutely necessary for other supports are contemplated such as an inwardly projecting flange. Of course, it is evident that the tubular member 1 should be large enough to provide for enough clearance for the articles contemplated to be used therein to pass therethrough. In this particular embodiment the spring means includes a large compression spring 7 located and supported within tubular member 1. Compression spring 7 must be of a sufficient length and expansion bias to dispense all the bottles or other articles placed within the tubular member 1. It is contemplated that other forms of spring means be utilized and still be within the scope of this invention, as for example, an extension spring or torsion spring coupled with pulleys may be utilized to pull the articles through the open end 2, or an air cushion may be utilized as the spring means. A seat or other form of platform 18 is placed on top of spring 7, thus providing a surface for articles to be placed upon within tubular member 1. Seat 18 may be of a rigid construction or, in the alternative, it may be a semi-rigid pad to establish a cushioning effect.

Within this particular dispenser are located three bottles 21, 22, and 23 all of the same type and stacked one upon the other. The lowermost bottle 21 is located on seat 18. A restrictor 20 or other form of stopping means is located adjacent the open end 2 of the tubular member. It is of such a material and of such a shape so as to temporarily prevent the passing of the bottles through the open end 2 and so as to permit the removal of the uppermost stacked bottle from the tubular member. The stopping means or restrictor 20 maintains the bottles within tubular member 1 but permits them to be placed therein and removed when desired.

The movable indexed tape means 30 comprises a substantially continuous tape or ribbon 31 movably supported in a taut path via a first pulley 32 and a second pulley 33. Pulleys 32 and 33 are rotatably connected to the sides of a channel 35 via connectors 60 and 61. Channel 35 may be connected to the external surface of tubular member 1 via conventional means or on the other hand may be fabricated as an integral part of member 1 by conventional extrusion methods. Tape 31 is connected to the movable end portion of the spring means at 37 through an extension 38 of seat 18. A slot 39 is provided in tubular member 1 for clearance of extension 38. To help maintain the taut path of tape 31 a tension spring 40 is provided in the tape's circuit. The tape 31 thus will move with the movement of the movable end portion of the spring 7. Since the position of the end portion of the spring means will depend upon the amount of articles within the dispenser, the position of tape 31 will indicate the amount of articles therein. To determine or gauge the position of tape 31 and consequently the amount of articles remaining, it is indexed with numerals that are spaced apart a predetermined distance on the outwardly facing portions of the tape as shown in FIG. 2. The spacing is determined by the size of the containers or bottles utilized in the dispenser. If the dispenser is to be used at different times for different size containers, multiple scales may be utilized on the indexed tape 31 as shown in FIG. 2. A suitable reference means such as window 47 is located adjacent to a portion of the tape 31 for gauging the position of the indexed tape and thus for gauging the amount of stacked articles within the tubular member. Preferably, for convenience in manufacturing and utilization window 47 is located on flange 3 or the escutcheon of dispenser unit but on the other hand may be located on the top of the countertop or cart top 4. The positioning and calibration of the numbers on tape 31 is determined by the relationship of the location of reference means and the size of the bottles stored. In this particular device three bottles 21, 22, and 23 of a given size have been placed within the container and are maintained therein by the stopping means 20. The tape 31 has been calibrated so that a number 3 of Scale (a) is sighted through window 47. The spacing of the rest of the numbers of Scale (a) are determined by the heights of the bottles 21, 22, and 23 as well as other bottles of similar dimensions. If smaller bottles were utilized in this particular device, an alternate Scale (b) such as the one illustrated in FIG. 2 may be utilized. In this manner the particular metering device may be utilized with various sized bottles without changing tape 31. Of course, bottles utilized must be of the same dimensional configuration of one group to affectively meter through window with one appointed index per configuration of bottle group.

In FIG. 4 a modified embodiment of a movable indexed tape means as may be utilized in conjunction with the present invention is illustrated. In the stead of a continuous indexed tape, a tape 49 having a first end 50 and a second end 51 is utilized. The first end 50 is connected to the movable end portion of a spring means 7' via an extension 38'. Of course, the other details (not shown) of the dispenser may be similar to that illustrated in FIGS. 1 and 3. The second end 50 is connected to a spring loaded take-up pulley or reel 55 having a coil spring 71 biased to maintain tape 49 in a taut path in all positions of the spring means. Of course, tape 49 would have surface 70 indexed with numerals similar to the numerals shown on tape 31. As the spring means 7' moves, depending upon the amount of bottles or other articles within the dispenser, tape 49 either winds or unwinds about reel 55. The numerals on tape surface 70 are visible from a window 47'. Of course, tape 49 may have alternate scales for various sized bottles or other articles.

From the foregoing description, it is seen that the present invention provides for a dispensing unit for storing and dispensing a plurality of articles, such as bottles, having a means by which the number of bottles remaining within the dispensing unit is known. Although I have described my invention with a certain degree of particularity, it is understood that the present disclosure has been made only by way of example and that numerous changes in the details of construction and the combination and arrangement of parts may be resorted to without parting from the spirit and scope of the invention as hereinafter claimed.

I claim as my invention:

1. A dispenser for storing and dispensing a plurality of stacked articles, having a metering system for determining the amount of articles remaining in said dispenser which comprises in combination:
   a. an elongated hollow tubular member for containment of said stacked articles, said tubular member having an open end thereof;
   b. spring means located within said tubular member for urging said articles through the open end thereof;
   c. deformable stopping means adjacent to the open end of said tubular member for restraining and temporarily preventing the passing of said articles through the open end thereof and for permitting the removal of the uppermost stacked article from said tubular member;
   d. an external indexed tape means rotatably supported about a pulley means at each end and connected to the movable end portion of said spring means for metering the movement of the end portion of said spring means, said pulley means at each end having stationary axes, said tape means including a movable tape having externally visible calibrated indices thereon, said indices corresponding exactly to the number of stacked articles within said tubular member; and
   e. reference means adjacent to a portion of said indexed tape for gauging the position of the tape with respect to said indices and thus for gauging the amount of stacked articles within said tubular member.

2. The dispenser of claim 1 further characterized in that said reference means comprises a window means disposed on said hollow tubular member.

3. The dispenser of claim 1 further characterized in that said indices comprise alternate calibrated numerals thereon for measuring the supply of stacked articles of different sizes.

* * * * *